(12) United States Patent
Bekritsky et al.

(10) Patent No.: US 10,762,310 B2
(45) Date of Patent: Sep. 1, 2020

(54) METHODS AND SYSTEM FOR ENHANCED RFID DIRECTION FINDING

(71) Applicant: ZEBRA TECHNOLOGIES CORPORATION, Lincolnshire, IL (US)

(72) Inventors: Benjamin J. Bekritsky, Modiin (IL); Michael J. Koch, Fort Salonga, NY (US); Charles Burton Swope, Coral Springs, FL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/235,651

(22) Filed: Dec. 28, 2018

(65) Prior Publication Data

US 2020/0210656 A1    Jul. 2, 2020

(51) Int. Cl.
*G06K 7/08* (2006.01)
*G06K 7/10* (2006.01)

(52) U.S. Cl.
CPC ..... *G06K 7/10366* (2013.01); *G06K 7/10316* (2013.01)

(58) Field of Classification Search
CPC ........... G06K 7/10099; G06K 7/10356; G06K 7/10366; G06K 19/07794; G01S 3/046; G01S 13/68; G01S 13/75; G01S 13/878; G01S 3/28; G01S 3/40; G01S 13/751; G01S 2013/0245; G06Q 10/087
See application file for complete search history.

(56) References Cited

U.S. PATENT DOCUMENTS

| | | | | |
|---|---|---|---|---|
| 6,043,779 A | * | 3/2000 | Lalezari | H01Q 3/26 342/371 |
| 2010/0134359 A1 | * | 6/2010 | Manholm | H01Q 1/246 343/700 R |
| 2013/0079045 A1 | * | 3/2013 | Ma | H04W 52/16 455/509 |
| 2016/0050062 A1 | * | 2/2016 | Moher | H04L 5/1461 370/278 |
| 2016/0103198 A1 | * | 4/2016 | Swope | G01S 3/28 342/372 |
| 2017/0109555 A1 | * | 4/2017 | Koch | G01S 13/751 |
| 2019/0034673 A1 | * | 1/2019 | Koch | G06K 7/10366 |

* cited by examiner

*Primary Examiner* — Thien M Le
(74) *Attorney, Agent, or Firm* — Yuri Astvatsaturov

(57) ABSTRACT

At least some embodiments of the present invention are directed to RFID reader systems, readers, and/or arrangements configured to estimate a directional bearing of an RFID tag. In an embodiment, the present invention is an RFID arrangement configured communicate with an RFID tag via a primary transmit and receive signals and to contemporaneously determine a plurality of RSSI levels of the RFID tag over a 360-degree azimuth range via a plurality of secondary receive signals.

30 Claims, 7 Drawing Sheets

METHODS AND SYSTEM FOR ENHANCED RFID DIRECTION FINDING

FIELD OF INVENTION

At least some embodiments of the present invention generally relate to RFID-based locationing, and more specifically, to techniques used to improve accuracy of bearing estimation of RFID tags.

BACKGROUND

Use of radio frequency (RF) identification (RFID) tags in association with tracking items is relatively common. RFID tags, which can be attached to items, can be programmed to carry a payload data associated with the respective items. Tracking the RFID tags and/or reading the tag payload enables one to track the associated articles and gather intelligence thereon. As the use of RFID tags continues to expand, so does the need for accurately estimating their locations. This applies to a wide range of venues (including retail stores, packaging facilities, storage facilities, etc.), and environments (including storage rooms, delivery vehicles, containers, etc.). Accordingly, there exist a need for improved devices, systems, and methods for determining RFID tag bearings with improved accuracy.

SUMMARY

In an embodiment, the present invention is an arrangement for estimating bearings of RFID tags. The arrangement includes: a housing; a housing; a transceiver assembly positioned at least partially within the housing, the transceiver assembly being communicatively coupled to a plurality of antenna elements; and a controller communicatively coupled to the transceiver assembly, the controller configured to: instruct the transceiver assembly to: transmit, via at least some of the plurality of antenna elements, a primary transmit signal; to receive, via at least some of the plurality of antenna elements, a primary receive signal, a receipt of the primary receive signal at least partially overlapping in time with a transmission of the primary transmit signal; and to receive, via at least some of the plurality of antenna elements, a plurality of secondary receive signals, a receipt of the plurality of secondary receive signals at least partially overlapping in time with the transmission of the primary transmit signal, wherein the primary transmit signal and the primary receive signal are used to communicate with an RFID tag within a predetermined zone pursuant to a predetermined communication protocol, and wherein the plurality of secondary receive signals are used to determine a plurality of signal strengths of a response from the RFID tag, each of the plurality of signal strengths being associated with one of the plurality of secondary receive signals; and estimate a bearing of the RFID tag based on at least some of the plurality of signal strengths of the response from the RFID tag.

In another embodiment, the present invention is a method of estimating bearings of RFID tags. The method includes: transmitting, via a transceiver assembly, a primary transmit signal; receiving, via the transceiver assembly, a primary receive signal, the operation of receiving the primary receive signal at least partially overlapping in time with the operation of transmitting the primary transmit signal; communicating, via the primary transmit signal and the primary receive signal, with an RFID tag within a predetermined zone pursuant to a predetermined communication protocol; receiving, via the transceiver assembly, a plurality of secondary receive signals, the operation of receiving the plurality of secondary receive signals at least partially overlapping in time with the operation of transmitting the primary transmit signal; determining, via a controller communicatively coupled to the transceiver assembly, from the plurality of secondary receive signals, a plurality of signal strengths of a response from the RFID tag, each of the plurality of signal strengths being associated with one of the plurality of secondary receive signals; and estimating a bearing of the RFID tag based on at least some of the plurality of signal strengths of the response from the RFID tag.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
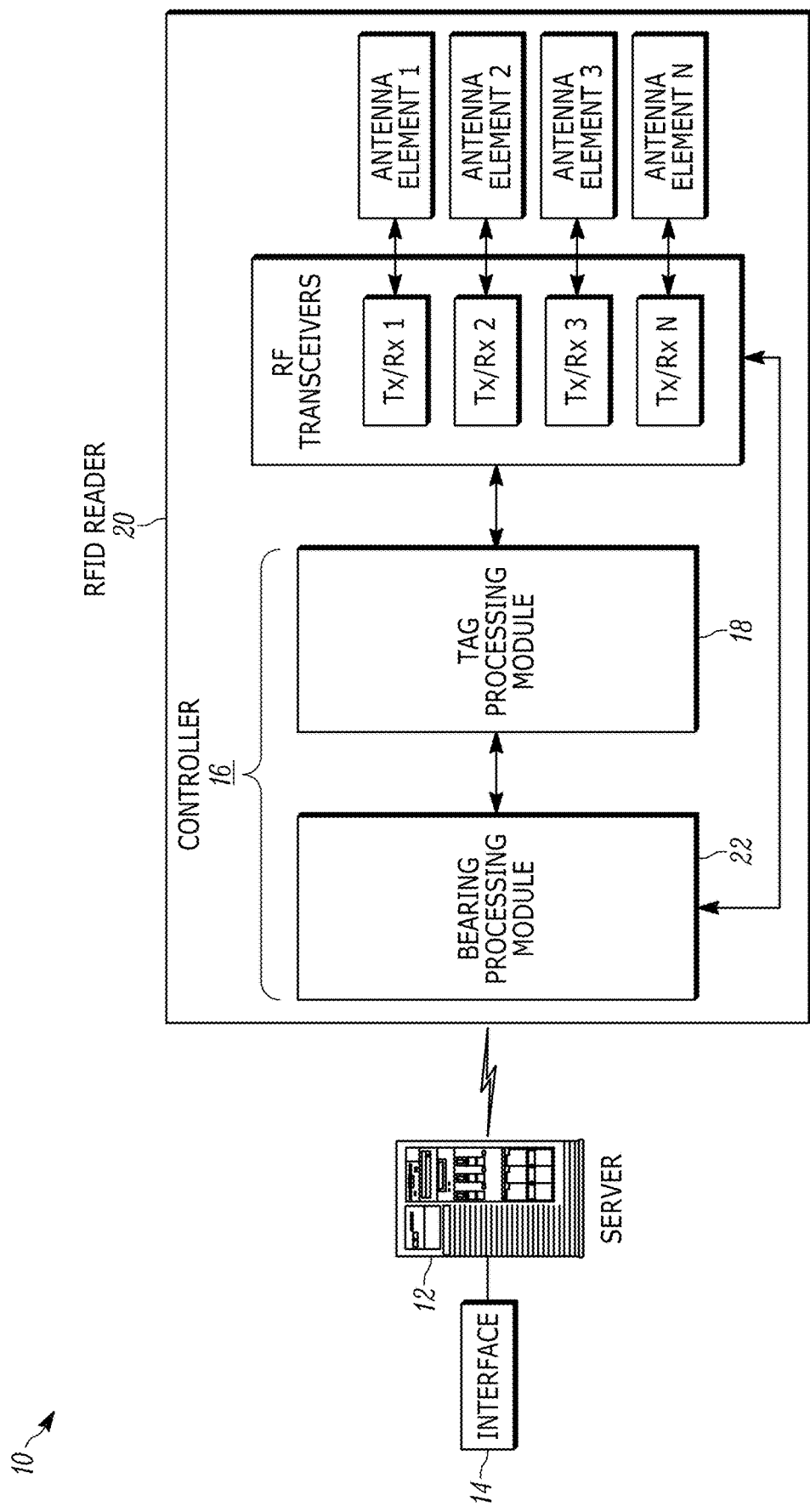
FIG. 1 is a schematic view of an exemplary arrangement for estimating bearings of RFID tag in accordance with the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Referring to the drawings, FIG. 1 depicts a simplified depiction of a radio frequency (RF) identification (RFID) tag reading system 10 for accurately determining bearings of RFID tags associated with items to be tracked or monitored.

The system 10 has an RFID reader 20, with a housing, connected to a server or host 12 and a user interface 14. In the present disclosure, either the RFID reader 20 or the system 10 may be considered an "arrangement." The RFID reader 20 has an array of antenna elements 1, 2, 3 ..., N, preferably a phased array. In some embodiments, at least one of the antenna elements 1, 2, 3 ..., N is an omnidirectional antenna element. In other embodiments, the entire array of antenna elements 1, 2, 3 ..., N is comprised of omnidirectional antenna elements. The RFID reader 20 also has a plurality of RF transceivers Tx/Rx 1, Tx/Rx 2, Tx/Rx 3, ..., Tx/Rx N, one transceiver for, and connected to, each antenna element. The number N is arbitrary and depends on the particular application. By way of non-limiting example, fourteen antenna elements and fourteen transceivers may be employed. Although FIG. 1 depicts one transceiver for each antenna element, this need not be the case. The number of transceivers may be different from the number of antenna elements. For example, a particular transceiver may be shared with two or more antenna elements. In some embodiments, a collection of transceivers, separate from antenna elements, may be referred to as a "transceiver assembly." Also, in some embodiments, a "transceiver assembly" may be used to refer to a collection of transceivers together with their respectively coupled antenna elements.

A controller or programmed microprocessor 16 is operatively connected to the transceivers to control their operation in one or more scans or modes of operation, as described below. The controller 16 executes a software-based, tag processing module 18 and also executes a software-based, bearing processing module 22. The modules 18 and 22 need not be software-based, but either or both of them could be hardware-based, or could be implemented in both software and hardware. Although the bearing processing module 22 is depicted in FIG. 1 as being implemented in the RFID reader 20, it will be understood that the bearing processing module 22, either in whole or in part, can also be implemented in the server 12. As such, in some embodiments, at least a portion of a controller may be situated separate from RFID reader 20.

Figure 2:
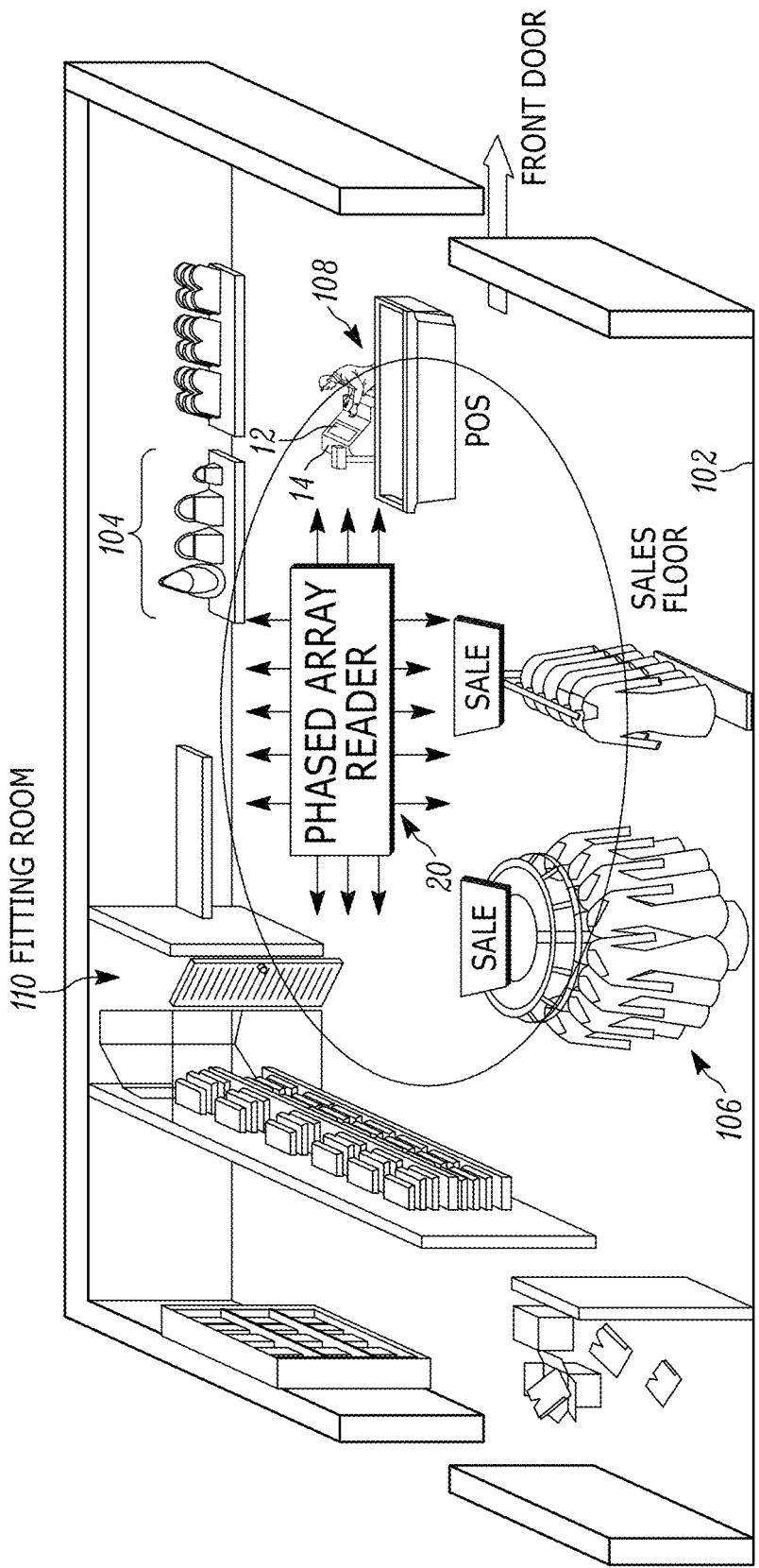
FIG. 2 is a perspective, schematic view of the system of FIG. 1 installed in an exemplary controlled area, especially for inventory control of RFID-tagged items.

FIG. 2 depicts an exemplary depiction of the RFID reader 20 deployed in a controlled area 102 of a retail sales floor having a point-of-sale (POS) station 108 at which the server 12 and the interface 14 may be provided, a fitting room 110, and a plurality of RFID-tagged items, e.g., clothes 106, handbags 104, etc., arranged on shelves, hangers, racks, on the floor, etc. in the controlled area 102. It will be understood that, in some applications, the server 12 is preferably located in a backroom, well away from the sales floor, or off-sight all together. Each RFID-tagged item 104, 106 is preferably associated with a passive RFID tag for cost reasons, although other types of RFID tags, as described above, may be employed. It will be further understood that, in some applications, for example, in a warehouse, each RFID tag is associated with a pallet or container for multiple items. To simplify the drawing, only one reader 20 has been illustrated, and the reader 20 has been illustrated as being preferably located overhead on the ceiling in the controlled area 102. It will be still further understood that more than one reader 20 could be deployed in the controlled area 102, and not necessarily deployed on the ceiling. Each reader 20 may be powered from an electrical outlet, powered over the Ethernet (POE), or can be battery powered.

The server 12 comprises one or more computers and is in wired, wireless, direct, or networked communication with the interface 14 and with the reader 20. The interface 14 provides a human/machine interface, e.g., a graphical user interface (GUI), that presents information in pictorial and/or textual form (e.g., representations of bearings of the RFID-tagged items 104, 106) to a human user, and to initiate and/or alter the execution of various processes that may be performed by the server 12 and/or by the controller 16. The server 12 and the interface 14 may be separate hardware devices and include, for example, a computer, a monitor, a keyboard, a mouse, a printer, and various other hardware peripherals, or may be integrated into a single hardware device, such as a mobile smartphone, or a portable tablet, or a laptop computer. Furthermore, the user interface 14 can be in a smartphone, or tablet, etc., while the server 12 may be a computer, either located at a controlled area 102 (see FIG. 2) containing the RFID-tagged items 104, 106, or remotely at some other location, or can be hosted in a cloud server. The server 12 can include a wireless RF transceiver that communicates with the reader 20. For example, Wi-Fi and Bluetooth® are open wireless standards for exchanging data between electronic devices.

Figure 3A:
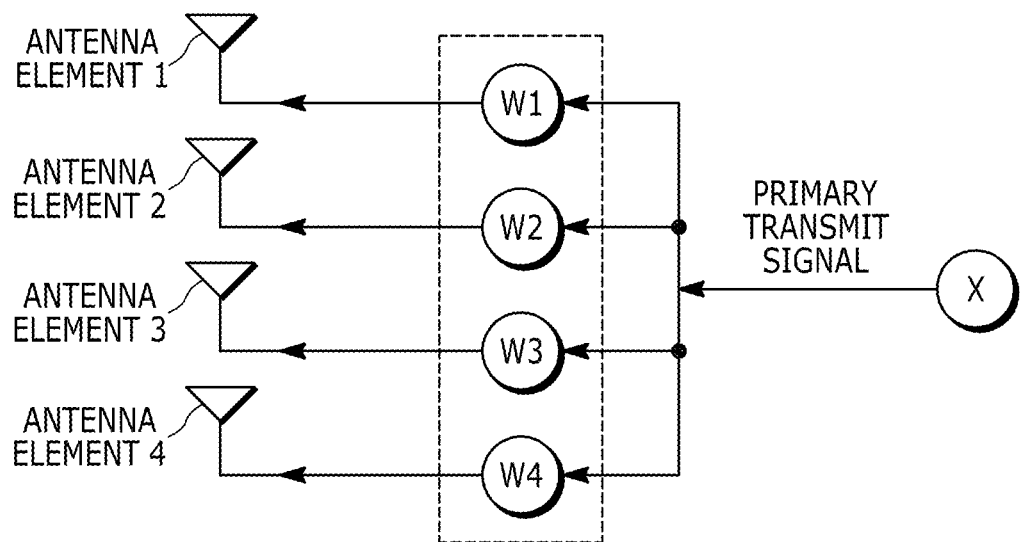
FIG. 3A is a schematic diagram depicting components of the overall system of FIG. 1 during transmission of the primary transmit signal.
Figure 3B:
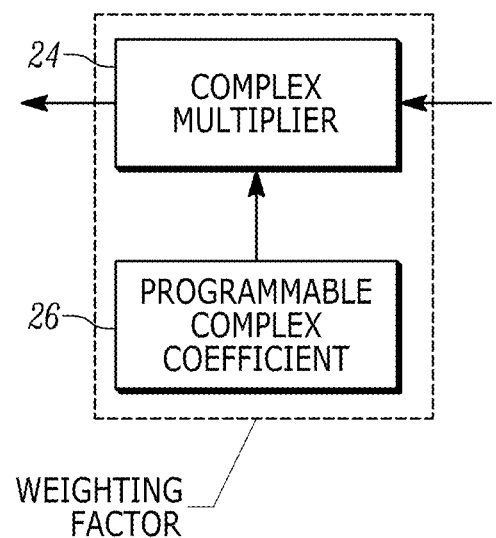
FIG. 3B is a block diagram depicting a detail of a weighting factor component for use in beam/signal steering in the system.

During execution of an RFID tag scan, the controller 16 executes the tag processing module 18 by which the transceivers are commanded to act as a primary transmit beam steering unit operative for steering a primary transmit beam over the controlled area 102 by transmitting a primary transmit signal (X) via the antenna elements to each tag. As used in the present disclosure, the terms "beam(s)" and "signal(s)" may be used synonymously and interchangeably. As shown in FIG. 3A, the primary transmit signal (X) is conducted along different channels (in this example, four) to a plurality of the antenna elements 1, 2, 3 and 4. Steering is accomplished by introducing a different weighting factor W1, W2, W3 and W4 on each channel. Thus, antenna elements 1, 2, 3, and 4 may be viewed as a phased array. As shown in FIG. 3B, each weighting factor is generated by a complex multiplier 24 and a programmable device 26 that sets a complex coefficient for the complex multiplier 24 to effect baseband steering of the primary transmit beam. Baseband steering of the primary transmit beam by setting a complex coefficient for each complex multiplier 24 is known, and details thereof can be obtained, for example, by reference to U.S. Pat. No. 8,587,495 and/or to "A Primer on Digital Beamforming", by Toby Haynes, in Spectrum Signal Processing, Mar. 26, 1998, the entire contents of said patent and said primer being incorporated herein by reference thereto.

Figure 4:
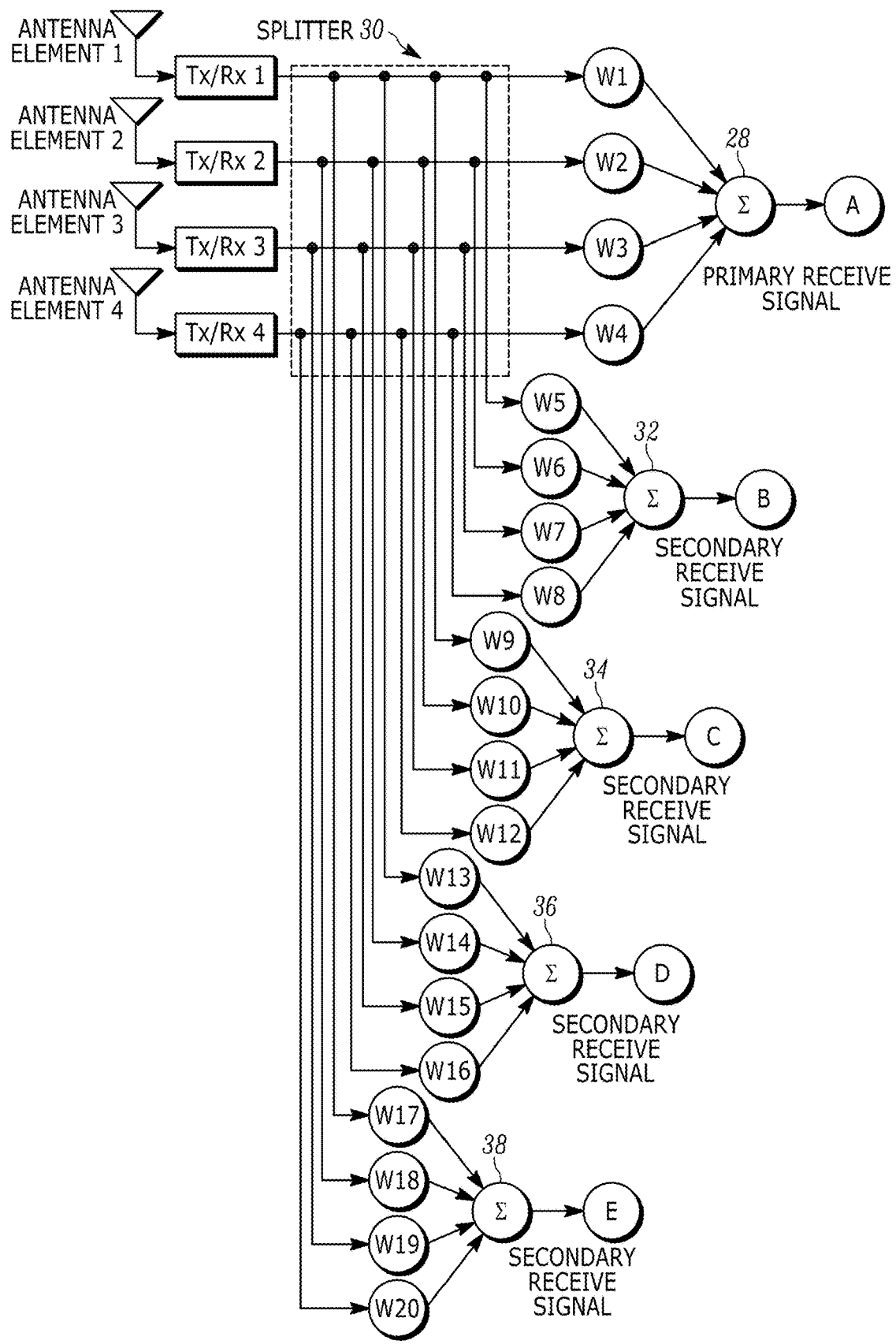
FIG. 4 is a schematic diagram depicting components of the overall system of FIG. 1 during reception of the primary receive signal, as well as of additional secondary receive signals.

During the scan, the controller 16 also executes the tag processing module 18 by which the transceivers are commanded to act as a primary receive beam steering unit operative for steering a primary receive beam at a primary steering angle by receiving a primary receive signal (A) via the antenna elements from each tag. In other words, the transceivers are commanded to receive a primary receive signal from along a predetermined direction (steering angle). As used in the present disclosure, references to receiving a signal(s) from or along a specific direction or angle should be understood to encompass sampling and/or determining a signal(s) from or along a specific direction or angle. Likewise, references to receiving a signal(s) from, along, or over a specific range (angular or otherwise) should be understood to encompass sampling and/or determining a signal(s) from, along, or over a specific range (angular or otherwise). As shown in FIG. 4, the antenna elements 1, 2, 3 and 4 receive return signals from each interrogated tag along different channels (in this example, four), and then a different weighting factor W1, W2, W3 and W4 is introduced on each channel before all the weighted return signals are summed in an adder 28 in order to generate the primary receive signal (A). Each weighting factor is generated by the circuit of FIG. 3B, which may or may not be considered to be a part of a transceiver assembly and/or a part of the controller. The sampling angle/direction of the primary receive signal is affected by the weighting factors W1, W2, W3 and W4. As illustrated, the weighting factors (FIG. 4) used in steering the primary receive signal is, in a preferred embodiment, the same as the weighting factors (FIG. 3A) used in steering the primary transmit signal. As a result, the steering angle for both the primary transmit signal and the primary receive signal is the same, or nearly so, i.e., they have a common boresight or general bearing. However, it will be understood that the weighting factors used in steering the primary receive signal may be different from the weighting factors used in steering the primary transmit signal, in which case, the steering angle for the primary transmit signal is different from the steering angle for the primary receive signal.

Figure 5:
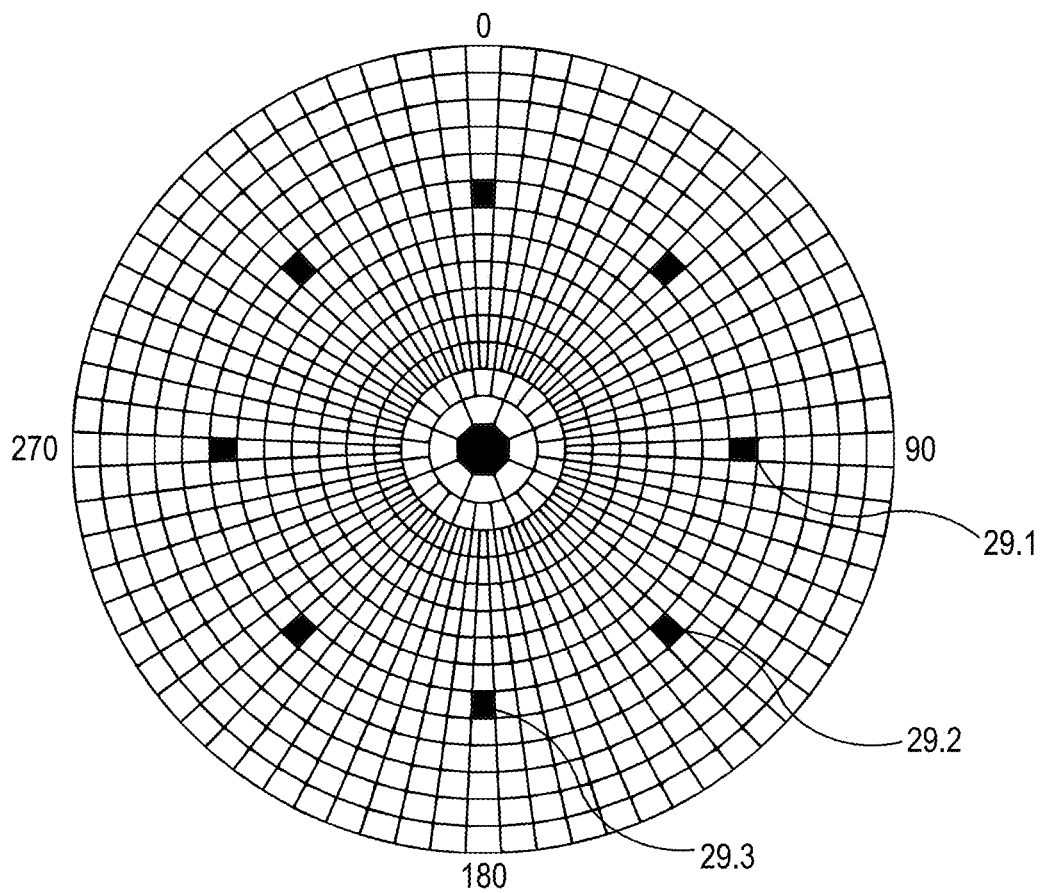
FIG. 5 is an exemplary polar diagram depicting an exemplary aim pattern of primary transmit signals transmitted by the system of FIG. 1.

FIG. 5 illustrates an exemplary polar diagram showing an exemplary aim pattern of primary transmit beams transmitted by an individual RFID readers 20. For such embodiments, it is assumed that the RFID reader is mounted in an overhead fashion, similar or same to the configuration of FIG. 2. The diagram extends over a 360-degree azimuth range and over a 70-degree elevation range with zero-degree elevation reference direction being at the center of the diagram, the 70-degree elevation direction being at the outer-most periphery of the diagram, and each concentric circle representing a change of 5 degrees in elevation relative to any adjacent circle. As can be seen in the diagram, the RFID reader can be configured to emit a plurality of (in this case nine) primary transmit beams based on primary transmit signals with each of the beams having its main lobe directed in a predefined azimuth and elevation direction 29.1, 29.2, . . . 29.n. For example, the primary transmit beam directed at 29.1 is transmitted in direction having an approximate bearing of 90 degrees azimuth and 45 degrees elevation.

The combination of the primary transmit signal and the primary receive signal are used by the RFID reader to communicate with an interrogated RFID tag pursuant to some predetermined protocol. Commonly, such communication can include reading the payload of the RFID tag and/or transmitting information to the RFID tag for recordation thereon. In some embodiments, the primary transmit beam has a beamwidth of less than or equal to 120 degrees. As used herein, the term "beamwidth" may be defined as the angle between the half-power (−3 dB) points of the main lobe of the beam, when referenced to the peak effective radiated power of the main lobe of the beam. The beamwidth of the primary transmit beam being less than or equal to 120 degrees can be measured across the azimuth plane, across the elevation plane, or a combination of the azimuth plane and the elevation plane. It should be understood that the angular values noted above are expressed in absolute terms and are not affected by the zero-degree reference direction along the azimuth plane and/or the zero-degree reference direction along the elevation plane. In other words, when measuring along the azimuth plane, a beam directed at a zero-degree azimuth bearing may have a beamwidth of 120 degrees when the half-power points of the main lobe of the beam are at 60 and 300 degrees. Similarly, a beam directed at a 90-degree azimuth bearing may have a beamwidth of 120 degrees when the half-power points of the main lobe of the beam are at 30 and 150 degrees. Along similar lines, when considering a beamwidth of a beam along an elevation plane, the angle that defines the beamwidth should be viewed in absolute terms irrespective of the zero-degree elevation direction. As such, when measuring along the elevation plane, a beam directed at a zero-degree elevation bearing may have a beamwidth of 120 degrees when the half-power points of the main lobe of the beam are at 60 degrees elevation, X degrees azimuth and 60 degrees elevation, X+180 degrees azimuth. Similarly, when measuring along the elevation plane, a beam directed at a 20-degree elevation, X-degree azimuth bearing may have a beamwidth of 60 degrees when the half-power points of the main lobe of the beam are at 50 degrees elevation, X degrees azimuth and 10 degrees elevation, X+180 degrees azimuth. In some embodiments, the gain of the primary transmit beam is greater than or equal to 6 dB. In some embodiments, a primary transmit beam may have a beamwidth of greater than or equal to 25 degrees. Conforming the primary transmit beam to the aforementioned characteristics may be particularly beneficial to avoid creating excessive interference with other electronic components (e.g., other RFID reader) that may be present within the vicinity of the RFID reader while still retaining sufficient coverage.

Referring back to FIG. 4, the return signals from each interrogated tag from the antenna elements 1, 2, 3 and 4 are conducted through respective RF transceivers Tx/Rx 1, Tx/Rx 2, Tx/Rx 3, Tx/Rx 4, to a splitter 30 (which may or may not be considered to be a part of a transceiver assembly and/or a part of the controller), and then routed to four sub-circuits (which may or may not be considered to be a part of a transceiver assembly and/or a part of the controller) to simultaneously generate four different secondary receive signals, each being sampled from a predetermined direction, as described below. Thus, the return signals are conducted from the splitter 30 to weighting factors W5, W6, W7 and W8 before being summed in an adder 32 to generate a secondary receive signal (B), to weighting factors W9, W10, W11 and W12 before being summed in an adder 34 to generate a secondary receive signal (C), to weighting factors W13, W14, W15 and W16 before being summed in an adder 36 to generate a secondary receive signal (D), and to weighting factors W17, W18, W19 and W20 before being summed in an adder 38 to generate a secondary receive signal (E). Put another way, the return signal from antenna element 1 is conducted through transceiver Tx/Rx 1 to weighting factors W1, W5, W9, W13 and W17; the return signal from antenna element 2 is conducted through transceiver Tx/Rx 2 to weighting factors W2, W6, W10, W14 and W18; the return signal from antenna element 3 is conducted through transceiver Tx/Rx 3 to weighting factors W3, W7, W11, W15 and W19; and the return signal from antenna element 4 is conducted through transceiver Tx/Rx 4 to weighting factors W4, W8, W12, W16 and W20. It is to be understood that this approach should not be viewed as being limited to four secondary receive signals and can be extended any number n of secondary receive signals with the appropriate hardware and/or software and the appropriate weighing factors.

In the currently described embodiment, each weighting factor W5 through W20 is generated by a circuit identical or similar to that depicted in FIG. 3B. However, it is to be understood that other circuits can be used to generate other and/or additional weighing factors. Each set of weighing factors W5-W8, W9-W12, W13-W16, and W17-W20 can be selected to sample each respective secondary receive signal from a predetermined direction defined by a certain azimuth and elevation angle value. By that virtue, generating other and/or additional weighing factors can provide the ability to sample any one of a plurality of secondary receive signals from a desired direction.

While the combination of the primary transmit signal and the primary receive signal may be used by the RFID reader primarily for communication with an interrogated RFID tag pursuant to some predetermined protocol, secondary receive signals may be employed to monitor and/or determine the strength of a signal (e.g., RSSI) being received from any one RFID tag and ultimately used for bearing estimation.

Thus, four secondary receive signals can be been formed. It will be understood, however, that this disclosure is not intended to be limited to a group of four antenna elements, four secondary receive signals, four weighting factors for each secondary receive signal, and/or twenty weighting factors in total. Different numbers or groups of antenna elements, different number of weighing factors, different numbers or groups of secondary receive signals, etc. could be employed. For example, with an appropriate number of transceivers and antenna elements, and an appropriate number of circuits generating an appropriate number of weighting factor, it is possible to generate a plurality of secondary receive signals where that plurality samples signals from a relatively broad angular spectrum across both azimuth and elevation. Such a broad coverage is exemplified by FIGS. 6A and 6B which provide exemplary heatmaps, represented via polar diagrams, of an RFID tag response as determined from a plurality of secondary receive signals. Each heatmap is based on the RSSI levels of a signal received across a plurality of directions defined by bounded areas, each of which is defined by predetermined azimuth and elevation values. Furthermore, each bounded area is representative of one secondary receive signal received from a respective direction having an azimuth and elevation value or being bound by a set of azimuth and elevation values. To view it another way, each heatmap is based on a plurality of secondary receive signals, where each secondary receive signal is received from a respective direction having a respective azimuth and elevation bearing (represented by the individually bounded areas within each heatmap) and a respective polarization, and each secondary receive signal is used to determine the signal strength of an RFID tag response as it is measured along the respective direction of the given secondary receive signal. The determined signal strengths can then be used (by, for example, the bearing processing module 22) in the estimation of a bearing of the responding RFID tag. While some approaches may rely on using all the determined signals strengths, other approaches may rely on only some of those signal strengths (e.g., the strongest signal strength) to estimate the bearing. In the example of the latter case, the estimated bearing of the RFID tag may be associated with the bearing of the secondary receive signal with the greatest receive signal strength.

Figure 6A:
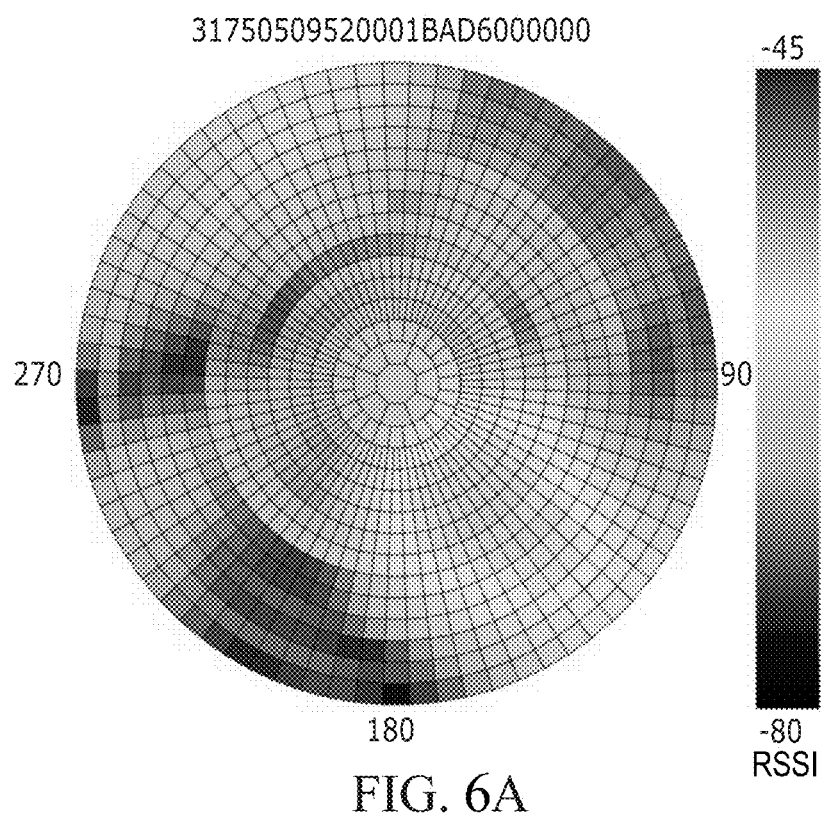
FIGS. 6A and 6B are exemplary heatmaps of RFID tag responses generated by an exemplary plurality of secondary receive signals.
Figure 6B:
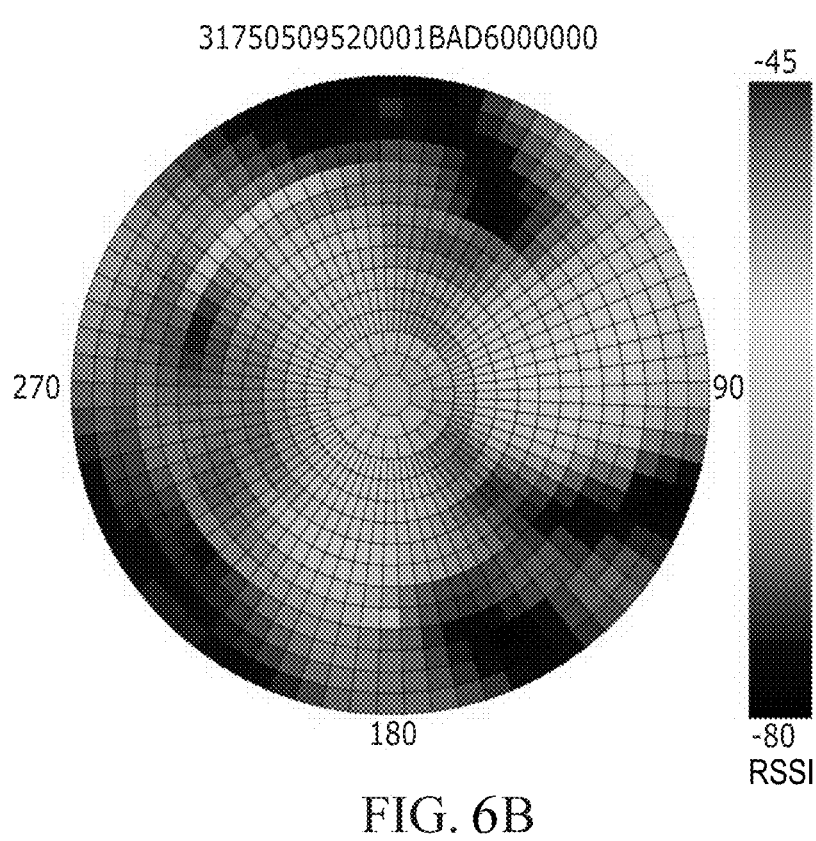

As can be seen from the illustrations, the arrangements employed to generate each heatmap of FIGS. 6A and 6B are configured such that plurality of secondary receive signals are received over a 360-degree azimuth range and a 70-degree elevation range with zero-degree elevation reference direction being at the center of the diagram, the 70-degree elevation direction being at the outer-most periphery of the diagram, and each concentric circle representing a change of 5 degrees in elevation relative to any adjacent circle. However, other configurations are also within the scope of the present disclosure. For example, in some embodiments the plurality of secondary receive signals are received over a 45-degree or greater elevation range. In some other embodiments the plurality of secondary receive signals are received over a 90-degree or greater elevation range. In some embodiments, the plurality of secondary receive signals are received over a 180-degree or greater azimuth range. Preferably, for each of the plurality of secondary receive signals with a respective azimuth bearing and a respective elevation bearing, each azimuth bearing is separated from at least one other azimuth bearing by an equal angle along the same elevation bearing. By way of example, this is represented in FIGS. 6A and 6B where each secondary receive signal with an elevation bearing of 70 degrees is separated from an adjacent secondary receive signal by five degrees along the azimuth plane.

In some instances, it may be desirable to maintain a predetermined relationship between the primary transmit beam and the overall sampling coverage range of the secondary receive signals. As such, in some embodiments, the RFID reader can be configured to transmit a primary transmit beam with a beamwidth of a first angular value, and receive the plurality of secondary receive signals over an angular range having a second angular value that is greater than the first angular value. For example, the first angular value corresponding to the beamwidth of the primary transmit beam can be less than or equal to 120 degrees, and the overall angular range over which the plurality of secondary receive signals are received can be greater than 120 degrees. In this instance, it should be appreciated that the angular values is expressed as absolute values irrespective of zero-degree reference direction for either azimuth and/or elevation.

To enable improved functionality, the receipt of the primary receive signal and the receipt of the plurality of secondary receive signals at least partially overlap in time with the transmission of the primary transmit signal. Thus, during the interrogation of the RFID tag, the RFID reader is operable to communicate with the tag and contemporaneously (within the span of time of interrogating the tag) receive at least one set of secondary receive signals in accordance with the description herein. This approach can be particularly advantageous as it can significantly reduce the time needed to obtain RSSI levels from an RFID tag from across a relatively broad angular spectrum. Additionally, it can avoid a capturing a changing RSSI landscape due to a moving RFID tag. In other words, the set of data points associated with the obtained plurality of secondary receive signals can be captured substantially simultaneously, creating a snapshot captured over a relatively short period of time during which significant movement of the tag is not likely. This can lead to further improvements in the estimation of the bearing of the RFID tag. In some embodiments, the receipt of the primary receive signal and the receipt of the plurality of secondary receive signals occurs substantially simultaneously. Also, in some embodiments, the transmission of the primary transmit signal and the receipt of the plurality of secondary receive signals occurs substantially simultaneously. This can extend the sampling time of the secondary receive signals and potentially provide more accurate signal strength readings.

In some instances, like, for example, electrically noisy environments or non-ideally arranged RFID tags, it may be difficult to obtain a sufficiently strong response signal via the secondary transmit signals. In these cases, estimation of the tag bearing may be hindered. To address this, in some embodiments, the primary transmit signal is transmitted with a first polarization and at least one (and in some embodiments all) of the plurality of secondary receive signals are received with a second polarization that is different from the first polarization. For example, the polarization of the primary transmit signal can be one of circular or linear, and the polarization of at least one (and in some embodiments all) of the plurality of secondary receive signals can be another one of the circular or the linear. In general, variances among the polarizations may include, but are not limited to, linearly, circularly, horizontally, vertically, left hand circularly, right hand circularly, theta, and phi polarized signals.

In some embodiments, the concept of differing the polarization on the secondary receive signals can be expanded further to where two or more sets (sub-pluralities) of secondary receive signals with differing polarizations are generated during the transmission of the primary transmit signal. Taking an example that includes two sub-pluralities of secondary receive signals, the RFID reader can be configured such that the primary transmit signal is transmitted with a first polarization, each of the first sub-plurality of secondary receive signals is received with a second polarization that is different from the first polarization, and each of the second sub-plurality of secondary receive signals is received with a third polarization that is one of (i) different from the second polarization or (ii) same as the first polarization. In this case, the polarization of each of the second sub-plurality of secondary receive signals (i) must be different from the polarization of the first sub-plurality of secondary receive signals, and (ii) may be same as or different from the polarization of the primary transmit signal. Employing such an approach may be particularly advantageous in cases where the preferred polarization of the secondary receive signals is not known, and therefore implementing various polarizations can increase the likelihood that an accurate reading for the secondary receive signals will be received for at least one of the sub-plurality of secondary receive signals.

By way of example, it is possible that a transmission of a primary transmit signal and a receipt of a first and second sub-pluralities of secondary receive signals can yield the signal strength results illustrated in FIGS. 6A and 6B, respectively. In this case, in some embodiments, the estimate of the RFID tag bearing may be based on the maximum RSSI of a combined heatmap and the bearing associated with that maximum RSSI, where the combined heatmap respectively adds RSSI values between the two heatmaps for each pair of secondary receive signals associated with a given bounded area (or a given bearing).

Figure 7:
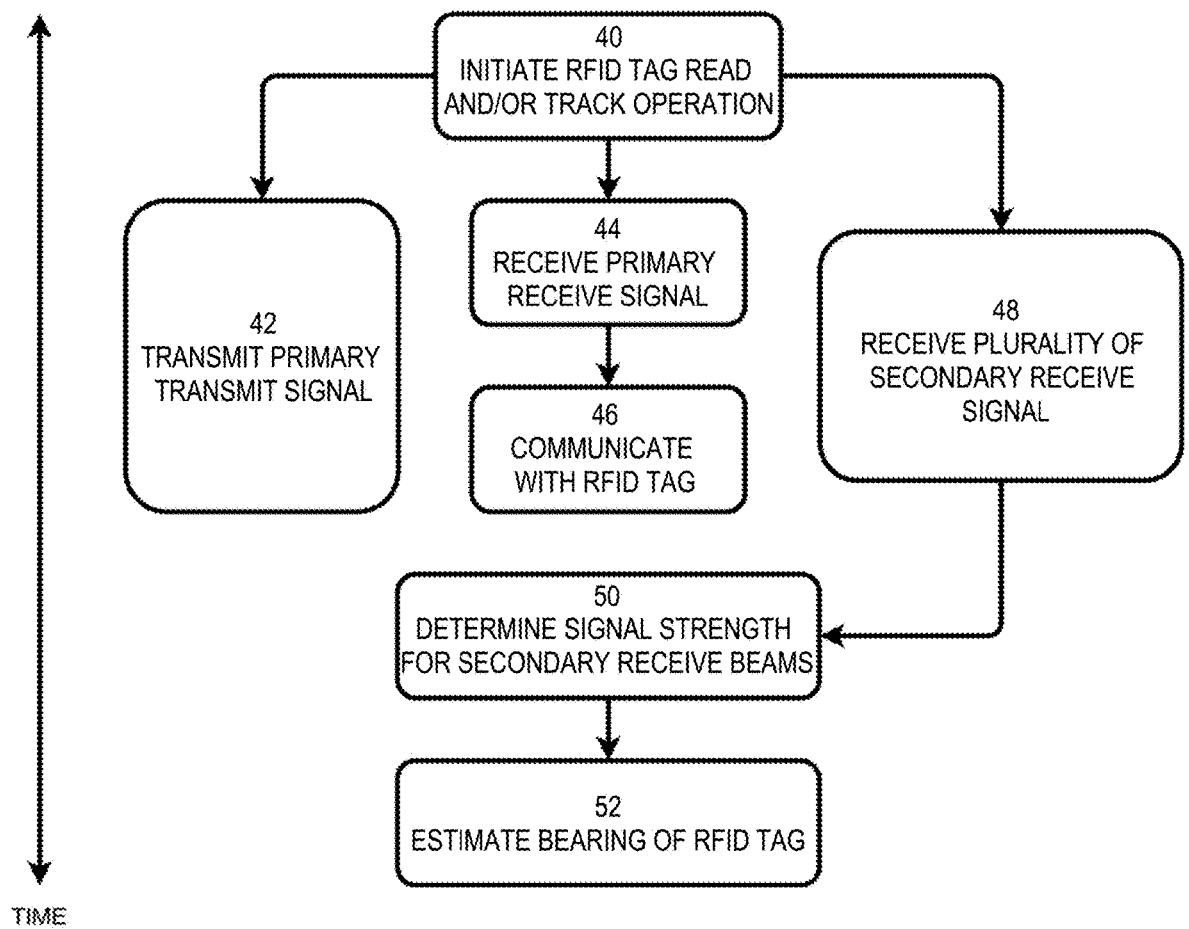
FIG. 7 is a flowchart representative of a method of estimating a location of an RFID tag in accordance with an embodiment of the present invention.

At least some of the aforementioned concepts may be implemented via a method described in the flowchart of FIG. 7. Upon the initiation 40 of an RFID tag read and/or track operation, the method includes the step of transmitting 42, via a transceiver assembly, a primary transmit signal. Additionally, the method includes receiving 44, via the transceiver assembly, a primary receive signal, communicating 46, via the primary transmit signal and the primary receive signal, with an RFID tag within a predetermined zone pursuant to a predetermined communication protocol, and receiving 48, via the transceiver assembly, a plurality of secondary receive signals. It should be noted that the operation of receiving 44 the primary receive signal and the operation of receiving 48 the plurality of secondary receive signals at least partially overlap in time with the operation of transmitting the primary transmit signal. This may be visualized with the 'time' components extending vertically along the flowchart of FIG. 7. Upon receiving the plurality of secondary receive signals, the method includes determining 50, via a controller communicatively coupled to the transceiver assembly, from the plurality of secondary receive signals, a plurality of signal strengths of a response from the RFID tag, where each of the plurality of signal strengths is associated with one of the plurality of secondary receive signals. Finally, the method includes estimating 52 a bearing of the RFID tag based on at least some of the plurality of signal strengths of the response from the RFID tag.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An arrangement for estimating bearings of radio frequency (RF) identification (RFID) tags, the arrangement comprising:
    a housing;
    a transceiver assembly positioned at least partially within the housing, the transceiver assembly being communicatively coupled to a plurality of antenna elements; and
    a controller communicatively coupled to the transceiver assembly, the controller configured to:
        instruct the transceiver assembly to:
            transmit, via at least some of the plurality of antenna elements, a primary transmit signal;
            to receive, via at least some of the plurality of antenna elements, a primary receive signal, a receipt of the primary receive signal at least partially overlapping in time with a transmission of the primary transmit signal; and
            to receive, via at least some of the plurality of antenna elements, a plurality of secondary receive signals, a receipt of the plurality of secondary receive signals at least partially overlapping in time with the transmission of the primary transmit signal,
            wherein the primary transmit signal and the primary receive signal are used to communicate with an RFID tag within a predetermined zone pursuant to a predetermined communication protocol, and
            wherein the plurality of secondary receive signals are used to determine a plurality of signal strengths of a response from the RFID tag, each of the plurality of signal strengths being associated with one of the plurality of secondary receive signals; and
        estimate a bearing of the RFID tag based on at least some of the plurality of signal strengths of the response from the RFID tag.

2. The arrangement of claim 1, wherein the receipt of the primary receive signal and the receipt of the plurality of secondary receive signals occur substantially simultaneously.

3. The arrangement of claim 1, wherein the transmission of the primary transmit signal and the receipt of the plurality of secondary receive signals occur substantially simultaneously.

4. The arrangement of claim 1, wherein the plurality of antenna elements include a plurality of omnidirectional antenna elements.

5. The arrangement of claim 1, wherein a beamwidth of a beam associated with the primary transmit signal has a first angular value, and
    wherein the plurality of secondary receive signal are received over an angular range having a second angular value that is greater than the first angular value.

6. The arrangement of claim 1, wherein a beam associated with the primary transmit signal has a beamwidth of less than or equal to 120 degrees, and
    wherein the plurality of secondary receive signals are received over an angular range that is greater than 120 degrees.

7. The arrangement of claim 1, wherein the plurality of secondary receive signals are received over a 180-degree or greater azimuth range.

8. The arrangement of claim 7, wherein a beam associated with the primary transmit signal has a beamwidth of less than or equal to 120 degrees.

9. The arrangement of claim 8, wherein the beamwidth is also greater than or equal to 25 degrees.

10. The arrangement of claim 7, wherein a gain of a beam associated with the primary transmit signal is greater than or equal to 6 dB.

11. The arrangement of claim 7, wherein the plurality of secondary receive signals are further received over a 45-degree or greater elevation range.

12. The arrangement of claim 1, wherein each of the plurality of secondary receive signals has a respective azimuth bearing and a respective elevation bearing, the azimuth bearing being from within a 180-degree or greater azimuth range.

13. The arrangement of claim 12, wherein each respective azimuth bearing is separated from at least one other respective azimuth bearing by an equal angle.

14. The arrangement of claim 1, wherein the controller is positioned at least partially within the housing.

15. The arrangement of claim 1, wherein the controller is further configured to estimate the bearing of the RFID tag based at least in part on a strongest signal strength of the plurality of signal strengths of the response from the RFID tag.

16. The arrangement of claim 1, wherein the primary transmit signal is transmitted with a first polarization, and wherein at least one of the plurality of secondary receive signals is received with a second polarization that is different from the first polarization.

17. The arrangement of claim 16, wherein the first polarization is one of circular or linear, and wherein the second polarization is another one of the circular or the linear.

18. The arrangement of claim 1,
wherein the primary transmit signal is transmitted with a first polarization,
wherein the plurality of secondary receive signals include a first sub-plurality of secondary receive signals and a second sub-plurality of secondary receive signals,
wherein each of the first sub-plurality of secondary receive signals is received with a second polarization that is different from the first polarization, and
wherein each of the second sub-plurality of secondary receive signals is received with a third polarization that is one of (i) different from the second polarization or (ii) same as the first polarization.

19. A method of estimating bearings of radio frequency (RF) identification (RFID) tags, the method comprising:
transmitting, via a transceiver assembly, a primary transmit signal;
receiving, via the transceiver assembly, a primary receive signal, the operation of receiving the primary receive signal at least partially overlapping in time with the operation of transmitting the primary transmit signal;
communicating, via the primary transmit signal and the primary receive signal, with an RFID tag within a predetermined zone pursuant to a predetermined communication protocol;
receiving, via the transceiver assembly, a plurality of secondary receive signals, the operation of receiving the plurality of secondary receive signals at least partially overlapping in time with the operation of transmitting the primary transmit signal;
determining, via a controller communicatively coupled to the transceiver assembly, from the plurality of secondary receive signals, a plurality of signal strengths of a response from the RFID tag, each of the plurality of signal strengths being associated with one of the plurality of secondary receive signals; and
estimating a bearing of the RFID tag based on at least some of the plurality of signal strengths of the response from the RFID tag.

20. The method of claim 19, wherein the operation of receiving the plurality of secondary receive signals and the operation of transmitting the primary transmit signal occur substantially simultaneously.

21. The method of claim 19, wherein the transceiver assembly includes a plurality of omnidirectional antenna elements.

22. The method of claim 19, wherein the operation of transmitting the primary transmit signal includes transmitting the primary transmit signal via a beam having a beamwidth with a first angular value, and
wherein the operation of receiving the plurality of secondary receive signals includes receiving the plurality of secondary receive signals over an angular range having a second angular value that is greater than the first angular value.

23. The method of claim 19, wherein the operation of transmitting the primary transmit beam includes transmitting the primary transmit signal via a beam having a beamwidth of less than or equal to 120 degrees, and
wherein the operation of receiving the plurality of secondary receive signals includes receiving the plurality of secondary receive signals over an angular range that is greater than 120 degrees.

24. The method of claim 19 wherein the operation of receiving the plurality of secondary receive signals includes receiving the plurality of secondary receive signals over a 180-degree or greater azimuth range.

25. The method of claim 19, wherein the operation of transmitting the primary transmit signal includes transmitting the primary transmit signal via a beam having a gain of greater than or equal to 6 dB.

26. The method of claim 19, wherein each of the plurality of secondary receive signals has a respective azimuth bearing and a respective elevation bearing, the azimuth bearing being from within a 180-degree or greater azimuth range.

27. The method of claim 19, the operation of estimating the bearing of the RFID tag is based at least in part on a strongest signal strength of the plurality of signal strengths of the response from the RFID tag.

28. The method of claim 19, wherein the operation of transmitting the primary transmit signal includes transmitting the primary transmit signal with a first polarization, and
wherein the operation of receiving the plurality of secondary receive signals includes receiving at least one of the plurality of secondary receive signals with a second polarization that is different from the first polarization.

29. The method of claim 28, wherein the first polarization is one of circular or linear, and wherein the second polarization is another one of circular or linear.

30. The method of claim 19, wherein the operation of transmitting the primary transmit signal includes transmitting the primary transmit signal with a first polarization,
wherein the operation of receiving the plurality of secondary receive signals includes receiving a first sub-plurality of secondary receive signals and receiving a second sub-plurality of secondary receive signals,
wherein the operation of receiving the first sub-plurality of secondary receive signals includes receiving the first sub-plurality of secondary receive signals with a second polarization that is different from the first polarization, and
wherein the operation of receiving the second sub-plurality of secondary receive signals includes receiving the second sub-plurality of secondary receive signals with a third polarization that is one of (i) different from the second polarization or (ii) same as the first polarization.

* * * * *